(12) United States Patent
Zaydman

(10) Patent No.: US 10,628,382 B2
(45) Date of Patent: Apr. 21, 2020

(54) TELEPORTING CONTENT OVER NETWORK USING HASH MATCHES

(71) Applicant: VMware, Inc., Palo Alto, CA (US)

(72) Inventor: Oleg Zaydman, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 251 days.

(21) Appl. No.: 15/449,934

(22) Filed: Mar. 4, 2017

(65) Prior Publication Data

US 2018/0253438 A1   Sep. 6, 2018

(51) Int. Cl.
G06F 17/30       (2006.01)
G06F 16/13       (2019.01)
H04L 29/08       (2006.01)
G06F 16/16       (2019.01)
G06F 16/178      (2019.01)
G06F 16/182      (2019.01)

(52) U.S. Cl.
CPC ............ G06F 16/137 (2019.01); G06F 16/16 (2019.01); G06F 16/178 (2019.01); G06F 16/1844 (2019.01); H04L 67/10 (2013.01)

(58) Field of Classification Search
CPC ......... G06F 17/30097; G06F 17/30215; G06F 17/30174; G06F 17/30115; H04L 67/10
See application file for complete search history.

(56) References Cited

U.S. PATENT DOCUMENTS

| | | | | |
|---|---|---|---|---|
| 6,131,192 A | * | 10/2000 | Henry | ........................ G06F 8/61 707/999.101 |
| 7,454,479 B2 | | 11/2008 | Alexander et al. | |
| 7,689,630 B1 | * | 3/2010 | Lam | .................... H03M 7/3066 707/802 |
| 9,195,494 B2 | | 11/2015 | Frank et al. | |
| 2006/0071122 A1 | | 4/2006 | St. Clair | |
| 2012/0004958 A1 | * | 1/2012 | Bloom | ............... G06Q 30/0241 705/14.4 |
| 2012/0254131 A1 | * | 10/2012 | Al Kiswany | ......... G06F 16/188 707/692 |

(Continued)

OTHER PUBLICATIONS

Bin Fan, David G. Andersen, Michael Kaminskyy, Michael D. Mitzenmacherz "Cuckoo Filter: Practically Better Than Bloom" CoNEXT'14, Dec. 2-5, 2014, Sydney, Australia, ACM 978-1-4503-3279-8/14/12.

*Primary Examiner* — Jeff A Burke
*Assistant Examiner* — Fernando M. Mari

(57) ABSTRACT

Files, e.g., disk-image files can be teleported from a source node of a network to a target node in that a copy of file can be assembled at least in part using file parts found on the target node. Source hashes can be generated based on segments of the source file. The source hashes can be sent by the source node and received by the target node. The target node compares each source hash with target hashes of segments of files on the target node. When a comparison results in a match, the file copy can include a copy of the matching target segment or include a reference to the matching segment. For higher performance, fingerprints of the source hash and the target hashes can be compared, with hash comparisons being performed in the event of a fingerprint match. The target fingerprints can be arranged in a cuckoo filter or other probabilistic filter.

32 Claims, 8 Drawing Sheets

(56) References Cited

U.S. PATENT DOCUMENTS

| | | | |
|---|---|---|---|
| 2013/0204903 A1* | 8/2013 | Hao | G06F 16/152 |
| | | | 707/802 |
| 2015/0288513 A1* | 10/2015 | Nelson | H04N 21/2407 |
| | | | 380/44 |
| 2016/0034587 A1* | 2/2016 | Barber | G06F 16/24532 |
| | | | 707/754 |
| 2016/0335288 A1* | 11/2016 | Qiu | G06F 16/178 |
| 2017/0011062 A1* | 1/2017 | Zaveri | G06F 16/2379 |

* cited by examiner

800

```
AT "NIGHT", TARGET NODE CREATES/UPDATES
COMMON SEGMENT FILE, COMMON HASH FILE, COMMON CUCKOO FILTER
810
         ↓
SOURCE NODE GENERATES 1ST SOURCE HASH FILE WITH ZERO-SEGMENT BITMAP 831
         ↓
SOURCE NODE SENDS & TARGET NODE RECEIVES 1ST SOURCE HASH FILE 832
         ↓
TARGET NODE CREATES 1ST CONTENT STRUCTURE & 1ST FILTER STRUCTURE &
1ST REQUEST BITMAP STRUCTURE
833
         ↓
POPULATE 1ST CONTENT STRUCTURE WITH ZERO SEGMENTS PER ZERO-SEGMENT BITMAP
834
         ↓
GENERATE SOURCE FINGERPRINTS FROM SOURCE HASHES 835
         ↓
COMPARE SOURCE FINGERPRINTS WITH COMMON FINGERPRINTS 836
         ↓
IF FINGERPRINT MATCH, COMPARE 1ST SOURCE HASH WITH COMMON HASHES 837
         ↓
IF HASH MATCH, POPULATE 1ST CONTENT STRUCTURE & CHECK NEIGHBORS 838
         ↓
IF NO HASH MATCH OR IF NO FINGERPRINT MATCH
POPULATE 1ST MISSING BITMAP & 1ST FILTER STRUCTURE
839
         ↓
TARGET NODE SENDS MISSING-SEGMENT BITMAP TO SOURCE NODE 840
         ↓
SOURCE NODE SENDS REQUESTED SEGMENTS TO TARGET NODE 841
         ↓
TARGET NODE POPULATES 1ST CONTENT STRUCTURE WITH REQUESTED SEGMENTS 842
```

TELEPORTING CONTENT OVER NETWORK USING HASH MATCHES

BACKGROUND

Virtual machines, that is, programs that emulate physical computers, can be stored, along with guest operating systems and programs running on the guest operating system, as virtual-machine images. Virtual machine images are files and, as such, can be stored, replicated, and transferred. Thus, when a virtual machine has been successfully created or updated, instances of it can be distributed, e.g., to other physical hosts. Since virtual-machine images can include programs and data associated with guest operating systems and applications, they can be quite large and, thus, consume a lot of network bandwidth as they are transferred. One of the challenges addressed herein is to reduce the bandwidth consumed by transferring virtual-machine images and other disk images.

BRIEF DESCRIPTION OF THE DRAWINGS

FIGS. 8A-D are flow charts of a teleportation process that uses fingerprint comparisons to enhance hash-comparison performance.

DETAILED DESCRIPTION

The present invention provides for "teleporting" content so that less than all the content is actually moved from the source node to a target node of a network. Herein, "teleporting" involves sending information that permits a copy of source content to be assembled at a target node using content resident on the target node. To the extent that content does not need to be moved, network bandwidth can be saved, minimizing congestion and conflict on the network.

Figure 1:
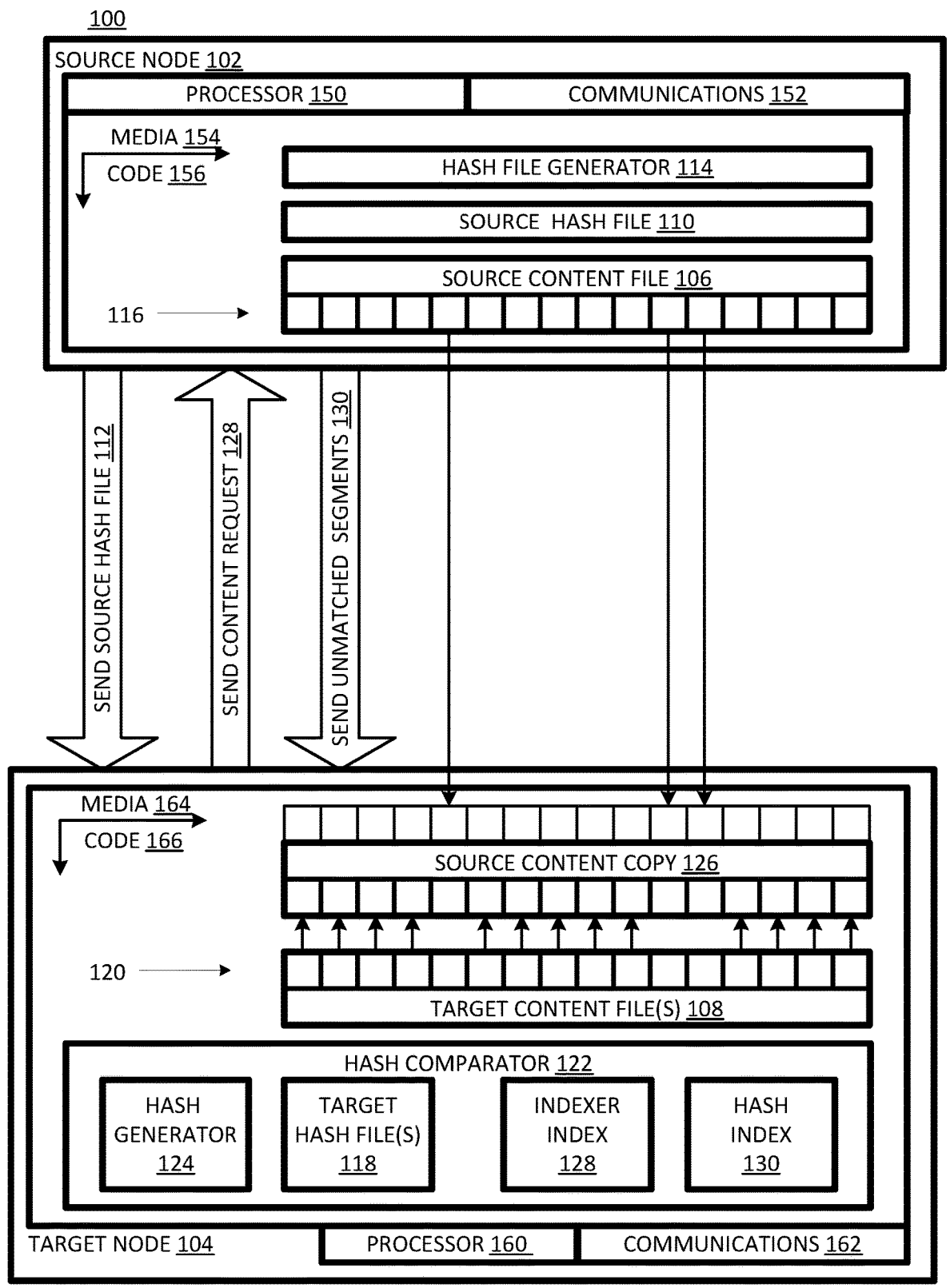
FIG. 1 is a schematic illustration of a content-teleportation network over which content can be teleported.

For example, a content teleportation network 100, shown in FIG. 1, includes a source node 102 and a target node 104. Source node 102 includes a source content file 106, a copy of which is required at target node 104. Target node 104 initially lacks a copy of source content file 102, but has one or more other target content files 108 that have been resident on target node 104 prior to teleportation of source content file 106. One or more of the target content files 108 may be earlier versions of source content file 106, which is provided by way of an update. Alternatively, the source and target files may be virtual-machine images with different applications but the same guest operating system. In other scenarios, the target files may be some other types of files. Also, network 100 may have additional source nodes and target nodes, and nodes can serve as both sources and targets depending on the direction of teleportation.

Instead of transmitting the source content file immediately, source node 102 can respond to a transfer request by generating a source hash file 110, which is transmitted initially in lieu of the source content file, as indicated by arrow 112 in FIG. 1. To this end, source node 102 may include a hash file generator 114. Hash file generator 114 treats source content file 106 as an array of segments 116, and generates a "source" hash for each segment. For example, hash file generator 114 can use SHA-3 or BLAKE-2 to generate 256-bit cryptographic hashes from 4096-byte segments. The hashes are arranged in the source hash file in the same way that the content segments are arranged in the source content file. Thus, the position of a hash in the source hash file identifies the position of the corresponding segment in the source content file. The source node can send content in blocks of hundreds or thousands of segments; the blocks can be processed sequentially, in parallel, or in a pipelined fashion.

After target node 104 receives source hash file 110, target node 104 compares the source hashes with "target" hashes, e.g., hashes in target hash files 118 generated from target segments 120 in target content files 108. To this end, target node 104 includes a hash comparator 122 that implements the comparison. In the way of preparation, hash comparator 122 includes a hash generator 124 for generating the target hash files 118. When a match is found, the target content segment corresponding to the target hash that is matched is placed in source content copy 126; it is placed at a location in source content copy 126 corresponding to the location in the source content file of the source content segment corresponding to the matched source hash. This assembling is performed for each match that is found.

Source node hardware includes a processor 150, communications devices 152, and non-transitory media (memory, disk, etc.) 154. Media 154 is encoded with code 156 that defines hash file generator 114, source hash file 110, and source content file 106. Target node hardware includes a processor 160, communications devices 162, and non-transitory media 164. Media 164 is encoded with code 166 defining hash comparator 122, source content copy 126, and target content files 108. In addition, codes 156 and code 166 can be executed to implement a teleportation process 200, as described below.

Figure 2A:
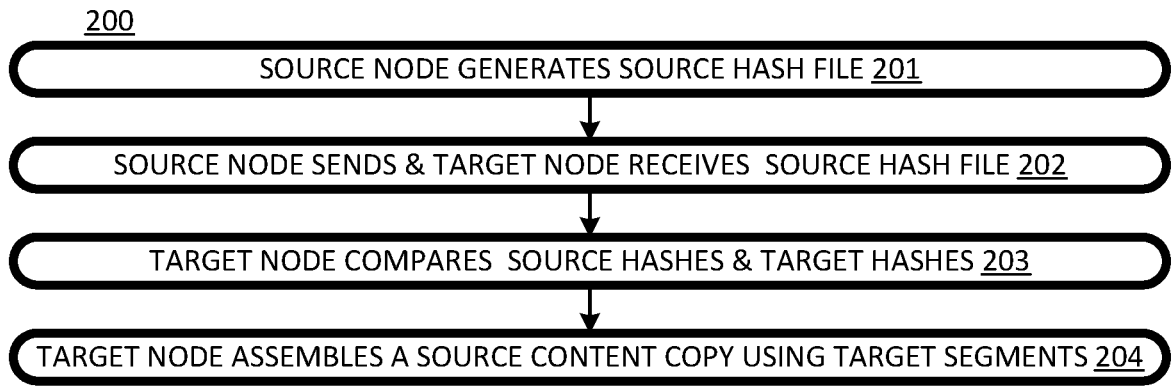
FIGS. 2A and 2B are flow charts of teleportation processes that can be implemented on the network of FIG. 1.

Teleportation process 200, which can be implemented in network 100 and other networks, is flow charted in FIG. 2A. At 201 a source node generates a source hash file of hashes derived from segments of a source content file. At 202, the source node sends and a target node (or a separate teleportation service node) receives the source hash file. At 203, the target node (or the separate teleportation service node) compares the source hashes with target hashes of target segments already resident on the target node. At 204, the target node assembles a copy of the source content file at least in part using the target segments.

The source hashes that fail to match a target hash are used to generate a request 128 (FIG. 1) for physical content transfer of the corresponding unmatched source content segments. The target content segments corresponding to the hash matches and the physically transferred source content segments associated with non-matching segments are arranged to constitute source content copy 126.

Figure 2B:
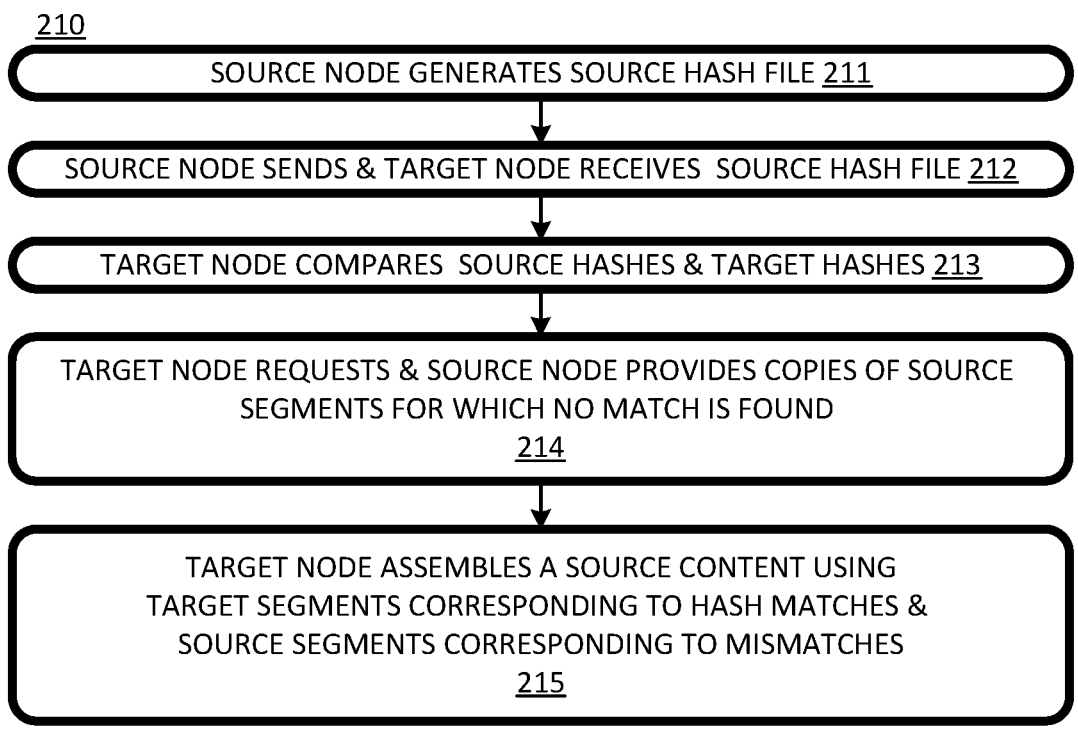

Thus, in the common case in which there are source segments for which there are no counterparts already resident on the target node, a process 210 can be implemented as shown in FIG. 2B. Actions 211, 212, and 213 of process 210, respectively correspond to actions 201, 202, and 203 of process 200. At 214, the target node requests (see arrow 130, FIG. 1) and the source node provides to the target node, copies of unmatched source-content segments for which the comparisons of action 213 find no counterpart on the target node. At 215, the target node assembles a copy of the source content file using: target segments corresponding to hash matches; and source segments sent because they corresponded to "mismatches", i.e., source hashes for which no matches were found at 213.

Teleportation is effective for large files that include subfiles that are aligned with segment boundaries. For example, operating system such as Windows and Linux generally align the beginnings of files at the boundaries of segments referred to as "clusters". Files larger than one segment are divided among plural segments. Two instances of the same file are divided among segments in the same way. Thus, the hashes of the corresponding segments containing the two instances match. In contrast, hashes for copies of a file that were not boundary aligned would not match, undermining the usefulness of the teleportation process. Virtual-machine image files and other disk image files preserve the boundary alignment of their subfiles, so teleportation is particularly effective with these types of files.

A brute-force comparison of each source hash with as many target hashes as required to find respective matches could consume an exorbitant amount of processing power. Accordingly, aspects of the invention provide approaches to reducing this burden. In particular, the invention provides an indexer 128 for indexing target hashes so that each indexed target hash serves as an input value in a lookup table (LUT), e.g., hash index 130, that outputs a pointer to a target segment (of a target content file), where the respective target segment is the segment from which the target hash was generated.

If there is a plurality of identical target segments that would generate identical target hashes, only one of the hashes need be represented in the index. Thus, one advantage of the index is to remove redundant comparisons. If there is no match found in the index, then the search for a match can be stopped and the corresponding content can be requested from the source node.

Figure 3:
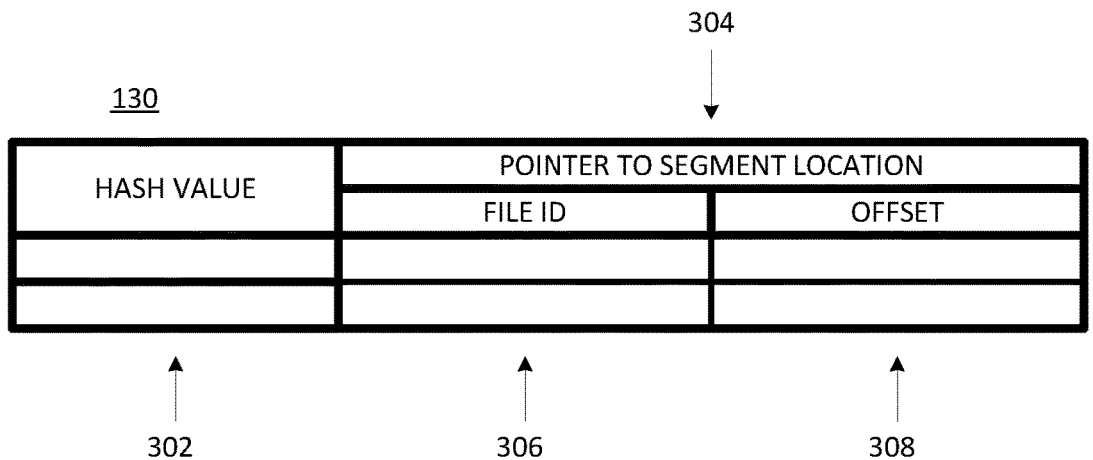
FIG. 3 is a schematic diagram of a hash index structure used in the network of FIG. 1.

Index 130 is represented in FIG. 3. Each hash value 302 is associated with a pointer 304 including a file identifier (ID) 306 and a file offset 308 of a segment in a content file. If there is only one target file or if each target content file has its own index, then the file-identifier field can be omitted and the offset serves as the pointer. In an alternative embodiment, each content file has its own index so that the file ID can be omitted and segment locations within the file can be specified solely by offsets.

The input hash values can be arranged in order in the index so that, for each source hash, only a relatively small range of the index need be searched for a match. Thus, the comparisons at 213 (FIG. 2B) can be with target hashes in the index. Some embodiments divide the index into sets wherein all the hashes in the set share the same leading (or other set) of bits. These leading bits can be used to address the sets, so that the comparisons involve comparing only the remaining (less significant) bits.

In some embodiments, an indexer creates a common segment file for hash matching purposes. The common segment file can include one instance of each distinct segment at the target node. While a common segment file can be large as it may accept segments from multiple target files, there is some saving since one segment in the common segment file can represent multiple instances of that segment in the regular target files. An advantage of having a common segment file is that other files, e.g., those that "donated" segments to the common segment file, can be deleted without adversely affecting teleportation. The common segment file can be used to generate a hash index in which each hash is associated with a pointer, e.g., an offset location of the corresponding segment in the common content file.

Disk images often contain segment sequences in common. Many content files have the property that neighbors of a matching segment often match neighbors of a matched segment. In other words, neighbor target segments of a target segment that matches a source segment are likely to match source neighbors of the matched source segment. Accordingly, when a match is detected between a source segment and a target segment, matches for neighboring source segments can be sought first among neighbors of the matching target segment. To the extent series of target segments match series of source segments, considerable processing time and effort can be saved using a neighbors-first search tactic. This means that as segments are added to a common segment file, their respective positions within sequences should be preserved insofar as possible.

Figure 4:
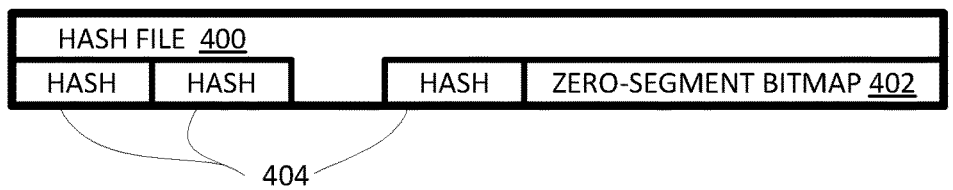
FIG. 4 is a schematic diagram of a hash file used in teleporting a file.

Another characteristic of virtual-machine images is that many of the segments may be filled with zeroes. An aspect of the invention takes advantage of this characteristic by providing a bitmap with one bit per segment of the source content file where "0" indicates a zero segment and "1" indicates a non-zero segment. The zero segments can be omitted from the source hash file when it is sent to the target node. The target node reads the bitmap and determines the locations of the received non-zero hashes (hashes not derived from a zero-filled segment) based on the zero-segment bit map. Thus, for example, a hash file 110 can include a zero-segment bit map 402, in addition to source hashes 404, as shown in FIG. 4. In this way, zero-filled segments are sent to the target node at a cost of one bit per segment. In some other embodiments, a hash file contains only hashes.

Figure 5:
FIG. 5 is a schematic diagram of a send-segment request to send source segments for which no matches could be found to aid in teleporting a file.

Similarly, target node 104 can send an unmatched-segment bitmap to source node 102 to indicate which source segments could not be found on the target node 104 and so must be sent from the source node 102 to the target node 104. Thus, a request 500 to send unmatched segments from a source node to a target node can include an unmatched-segment bitmap 502, as shown in FIG. 5.

Even with the various search techniques described above, teleporting virtual-machine images can require tens of thousands of hash comparisons. For performance reasons, it would be best to perform these comparisons in memory, avoiding disk accesses insofar as possible. However, due to the number of hashes, it may not be feasible to put a hash index (database) in memory. Furthermore, considerable time and effort can be consumed by matching hashes, especially, those that turn out to be non-matching.

Accordingly, the present invention provides for staged hash comparisons, including a first stage in which fingerprints are compared, and a second stage in which hashes are compared to rule out false-positive fingerprint matches. Herein, fingerprints are hash-like strings that are too short to preclude false-positive matches. For example, an 8-bit fingerprint can be derived from a 256-bit hash simply by selecting the eight most significant bits of the hash as the fingerprint. In the context of teleportation, if two hashes match, the likelihood that the corresponding 4096-byte segments do not match is negligible. However, if two 8-bit fingerprints match, there can be a non-negligible (on the order of 1%) chance of the hashes from which the fingerprints were derived do not match. Even if disk accesses are required to confirm fingerprint matches, there will be a performance gain relative to direct hash comparisons as long as the fingerprint comparisons are performed in memory.

Fingerprint comparisons can be performed using probabilistic filters, e.g., probabilistic filters that store fingerprints to which incoming fingerprints are compared. Probabilistic filters are described by Fan et al., in "Cuckoo Filter: Practically Better Than Bloom" (CoNEXT'14, Dec. 2-5, 2014, Sydney, Australia). Where the filters disclosed by Fan et al. store fingerprints only, the present invention provides for storing, in association with the fingerprints, pointers (e.g., file offsets) to locations of respective hashes. The hashes are used to confirm fingerprint matches and to indicate the location of the segment to be used in assembling a copy of a source content file at the target node.

In the two stage approach, the probabilistic filter can include pointers to hashes from their respective fingerprints. Thus, a pointer to a hash in the common hash file is, effectively, a pointer to the corresponding segment in the common segment file. This obviates a need for a pointer to be associated with a hash to locate the corresponding segment.

Figure 6:
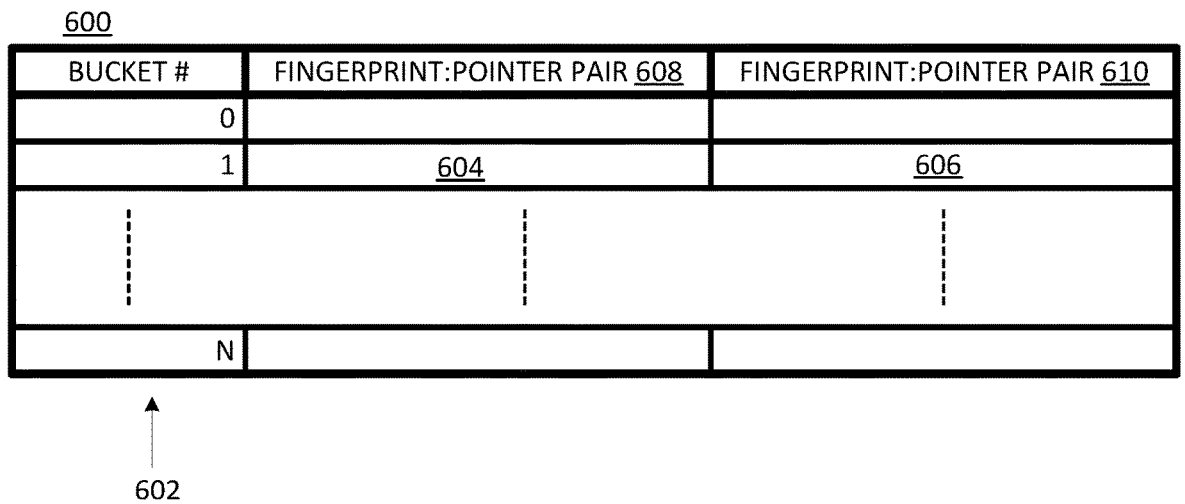
FIG. 6 is a schematic diagram of a fingerprint-based probabilistic filter, in this case, a cuckoo filter, used to enhance performance of hash comparisons in teleporting content.

As shown in FIG. 6, a cuckoo filter 600 includes a series of indexed buckets 602 (arranged as rows in FIG. 6). Each bucket includes two cells, e.g., the bucket with index "1" has cells 604 and 606, under respective column (field) "fingerprint:pointer pair" headings 608 and 610 in FIG. 6. Each cell can hold a fingerprint and a pointer to a hash from which that fingerprint was derived. For example, cell 604 holds an 8-bit fingerprint and a 24-bit file offset so that each entry is 32 bits; in this case, there is a space saving since each entry is one-eighth the size of a hash entry. In general, the number of buckets, the number of cells per bucket, and the number of bits in a fingerprint can be co-selected to meet memory constraints and otherwise optimize performance. The number of bits in the pointer can be based on the number of hashes in the hash file that corresponds to the cuckoo filter.

Figure 7:
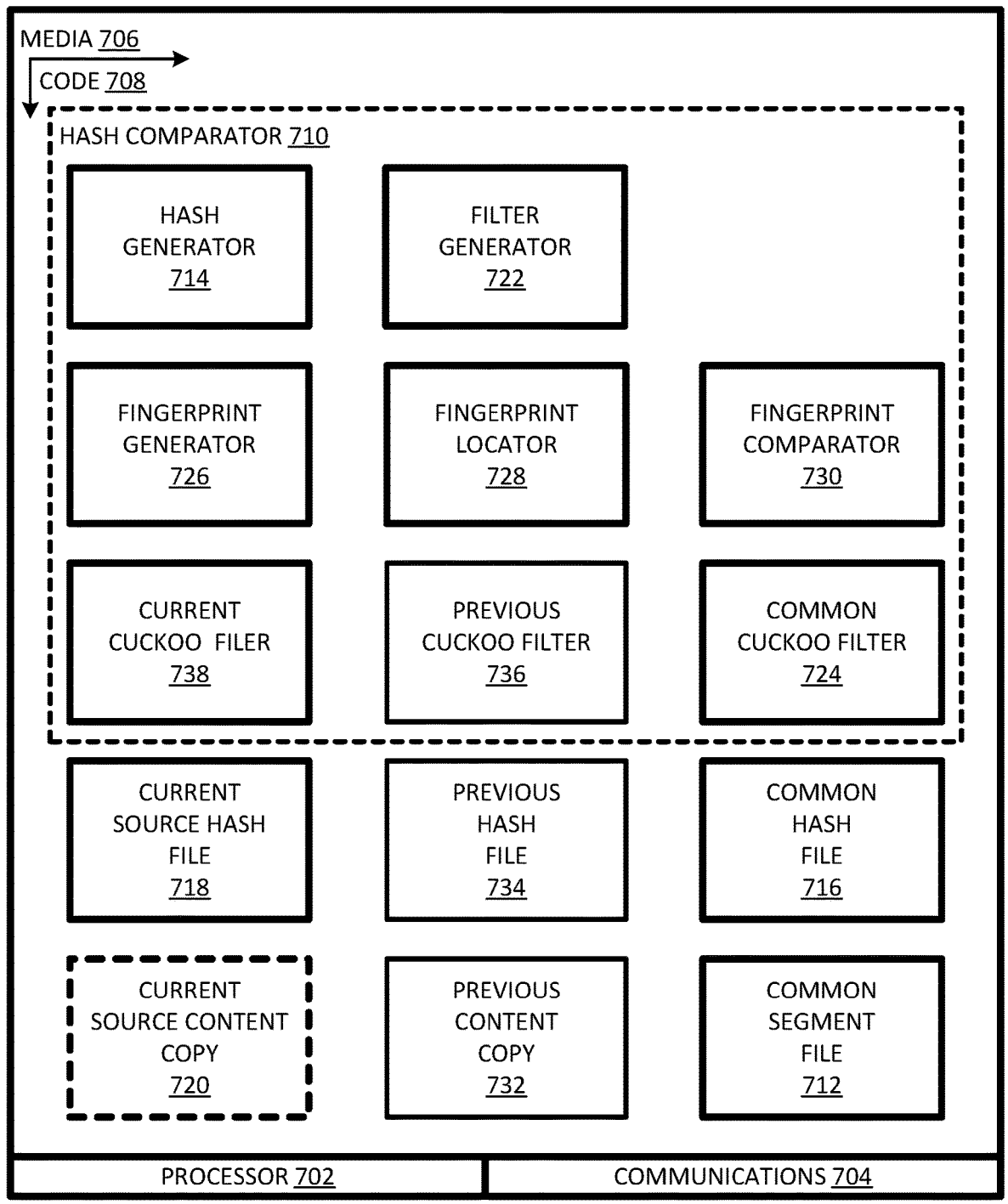
FIG. 7 is a schematic diagram of a target node that employs cuckoo filters to facilitate teleportation.

A target node 700 employing cuckoo filters is shown in FIG. 7; target node 700 can receive teleported content from source node 102 of FIG. 1. Target node 700 includes hardware including a processor 702, communications devices 704, and non-transitory media 706. Media 706 is encoded with code 708 that, when executed by processor 702, implements the functions of a hash comparator 710.

In accordance with an aspect of the invention, target node 700 includes a common segment file 712. Common segment file 712 includes all or most of the segments in files on target node 700. When a content file is deleted from target node 700, copies of its segments remain in common segment file 712 so that they can continue to be used for teleportation. Since it includes segments from multiple other files, a common segment file 712 can be several times larger than average content files. However, disk space can be saved by replacing segments in the content files in favor of pointers to locations of those segments in common segment file 712.

To compare hashes, a hash generator 714 generates a common hash file 716 of hashes of "common" segments in common segment file 712. When a source content file is to be teleported, the source node sends and the target node 700 receives a source hash file 718. In order to assemble a source content copy 720, the matches of hashes in the source hash file 718 and hashes in the common hash file 716 are sought using hash comparator 710.

Instead of comparing hashes directly, a filter generator 722 of hash comparator 710 creates a common cuckoo filter 724. A data structure is created for the filter 724. A fingerprint generator 726 generates fingerprints, e.g., 8-bit fingerprints, from the hashes in common hash file 716, e.g., by taking the eight most significant bits of each hash. Fingerprints so generated are associated, in common cuckoo filter 724, with pointers to locations of the respective hashes for which they were generated, and the fingerprint-pointer pairs are progressively entered into cells of common cuckoo filter 724. Each fingerprint-pointer pair is inserted into one of a pair of buckets determined by an insertion algorithm. To avoid overflow conditions in which a fingerprint-pointer pair cannot be entered because all appropriate cells are filled, the common cuckoo filter 724 can be several, e.g., 4, cells wide. Creation and updating of the common segment file 712, the common hash file 716, and the common cuckoo filter 724 can be performed during low utilization periods, e.g., at night.

When a source hash file is received by target node 700, fingerprint generator 726 generates fingerprints from the hashes of the source hash file. A fingerprint locator 728 applies an algorithm (as disclosed by Fan et al., ibid) for determining the two buckets of common cuckoo filter 724 that might hold a match for each fingerprint. A fingerprint comparator 730 then searches the cells of the two buckets for a match. If a match is found, hash comparator 710 compares the hash used to generate the source fingerprint with the hash referenced by the pointer associated with the common hash. If a match is found, a reference to the corresponding common segment of common content file 712 is entered into the current source content copy 720 being assembled at the location corresponding to that of the corresponding source segment in the source content file on the source node. If no match is found, a request for the corresponding content segment is formed, e.g., as part of a process for constructing a request including an unmatched-segment bitmap of segment locations.

In some scenarios, there might not be time to consolidate a teleported file into the common segment file before a second file is to be teleported. In such a case, at the time the second (current) file is being teleported, there will already be another "previous" source content copy 732 at target node 700. This copy 732 may include source segments and either teleported segments or references to segments in common segment file 712. Some of the teleported segments may not have counterparts in common segment file 712. So, it is desirable to leverage these additional segments when teleporting current source content copy 720. Since the previous source content copy 732 resulted from teleportation, there will be a previous source hash file 734 corresponding to the previous source content copy 732. Filter generator 722 can generate a previous cuckoo filter 736 corresponding to the previous source hash file 732 during teleportation of the previous source content file, as can be understood from the description of the generation of the current cuckoo filter 738 immediately below.

Once current source hash file 718 is received, a corresponding cuckoo filter structure can be created that will become the current cuckoo filter 738 during teleportation. Fingerprint generator 722 generates fingerprints for hashes in current source hash file 718 and fingerprint locator 728 determines the two buckets in the common cuckoo filter in which a potential match might be found for each fingerprint. Fingerprint comparator 730 compares each current source fingerprint with fingerprints, if any, in those two common buckets. If a match is found, the corresponding hashes are checked. If a hash match is found, a reference to the corresponding common segment is entered into the corresponding segment location of the current source content copy 720.

If a fingerprint match is followed by a hash match failure, or if the fingerprint comparison does not result in a match, previous cuckoo filter 736 is checked for matches at locations calculated based on the source fingerprint by fingerprint locator 728. If a fingerprint match is found, the corresponding hashes in the current source hash file 718 and the previous hash file are compared. In the event of a hash match, the corresponding previous segment is appended to the common segment file and corresponding entries are added to the common hash file and the common cuckoo filter. If there is no hash match, the unmatched fingerprint is added to current cuckoo filter 738, and a corresponding content request is sent to the source node. (Previous cuckoo filter 736 was populated in this way when the previous content copy was current.)

Figure 8A:
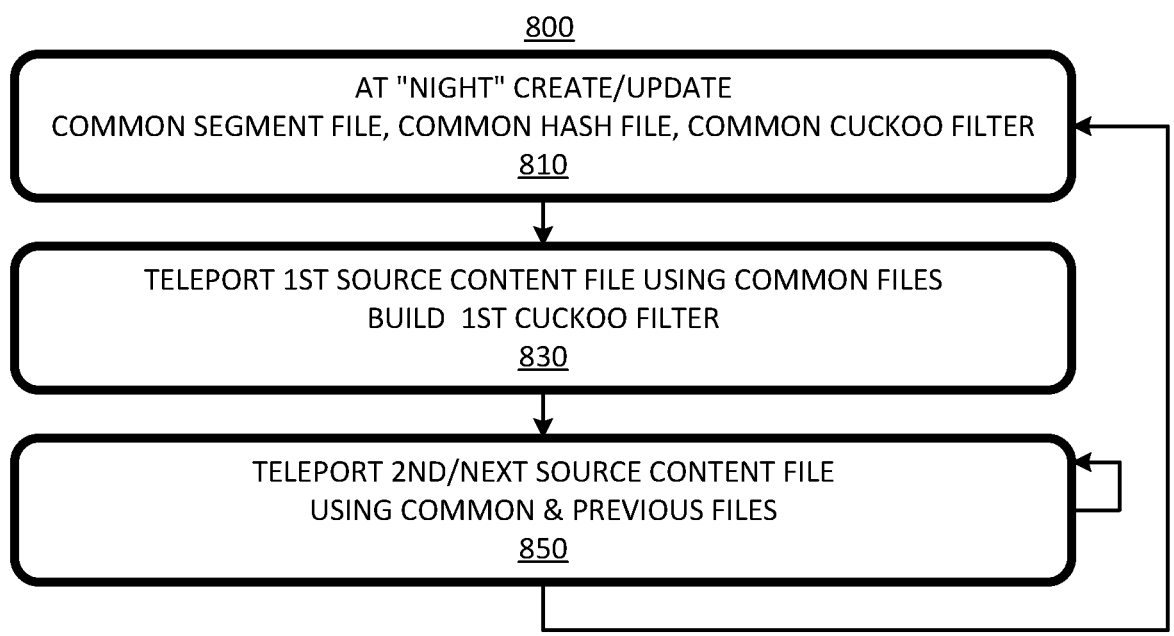

A process 800, flow charted in FIG. 8A, provides for treating the second and succeeding teleportation between common file consolidations differently from the first teleportation between the updates. At 810, the common segment file, the common hash file, and the common cuckoo filter are updated. These updates can occur at "night", in other words, during extended periods of low processor utilization for the target node. At 830, a first source content file is teleported to the target node. During the teleportation, the common segment file, the common hash file, and the common cuckoo filter are used to identify segments resident on the target node that can be used to build the source content copy.

During the first teleportation at 850, a first cuckoo filter is built based on the first source hash file. This first cuckoo filter is not used in the first teleportation, but is built for use in the event a second teleportation occurs before the common data structures are updated. The first cuckoo filter is populated with fingerprints for which there was no corresponding hash match, and therefore, for which a source segment had to be transmitted to the target node. In other words, the cuckoo filter includes fingerprints corresponding to the segments of the source content copy that are not yet represented in the common segment file.

A second teleportation occurs at 850 before the next consolidation. During the second teleportation, the second source content copy, the second hash file, and the second cuckoo filter are treated, respectively, as the "current" content copy, current hash file, and the current cuckoo filter. Also, during the second teleportation, the first content copy, the first hash file, and the first cuckoo filter are considered (e.g., in FIG. 7) to be, respectively, the previous content copy, the previous hash file, and the previous cuckoo filter. During the second/current teleportation, the current fingerprints are compared with the common fingerprints. Current fingerprints that do not match a common fingerprint are compared with previous fingerprints. Unmatched current fingerprints (and source fingerprints that matched previous fingerprints but turned out to be false positives) are entered into a current cuckoo filter.

In the event of a third teleportation between consolidations, the third teleportation is the current teleportation and the second teleportation is the previous teleportation. Action 850 is simply repeated. Note that, in the illustrated embodiment, only one previous cuckoo filter is used. The first cuckoo filter is not used during the third teleportation and may be discarded. More generally, for the second and subsequent teleportations between consolidations, only the common filter and one previous cuckoo filter are used to find hash matches. Eventually, process 800 returns to a consolidation at 810.

Figure 8C:
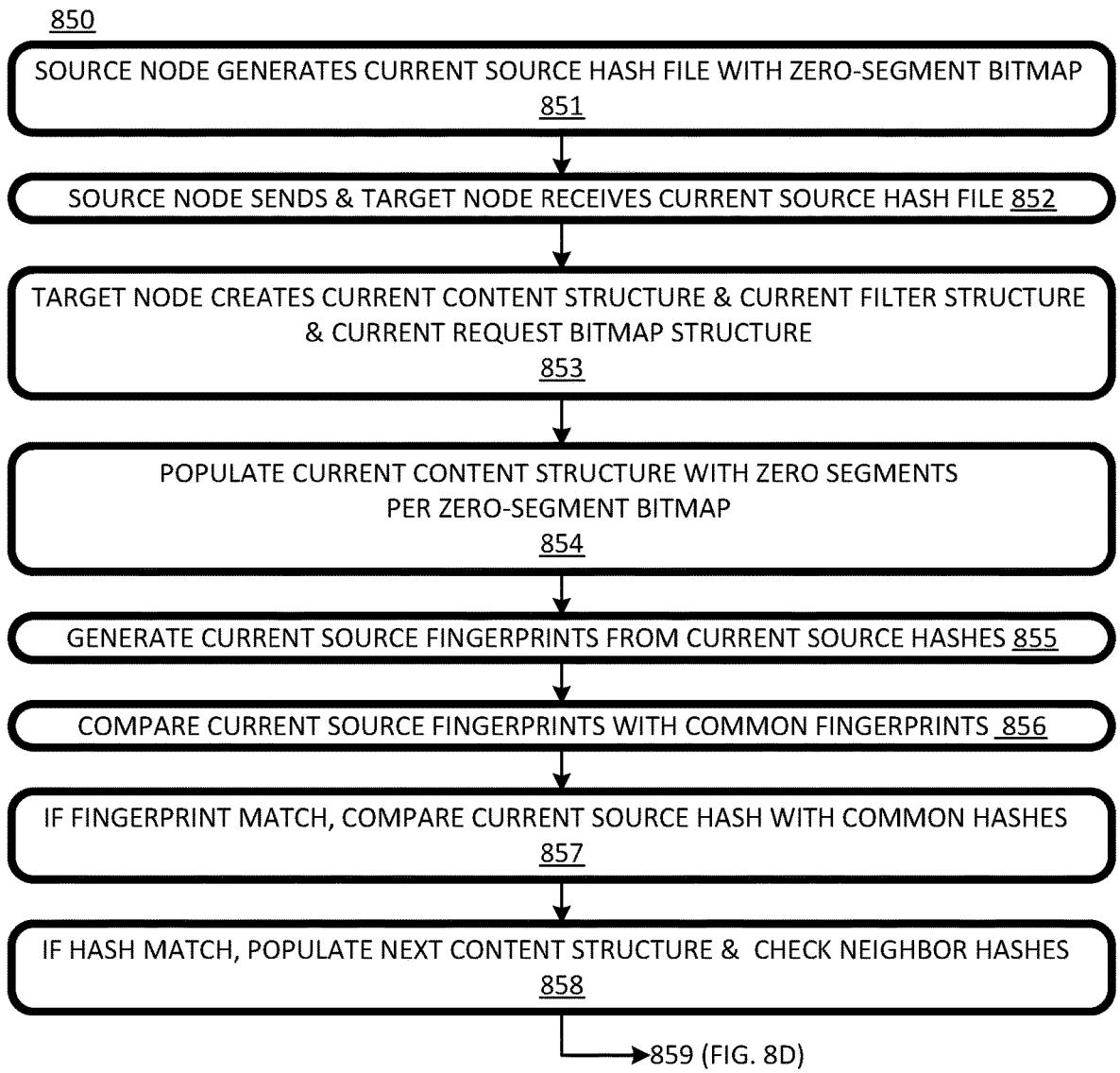
Figure 8D:
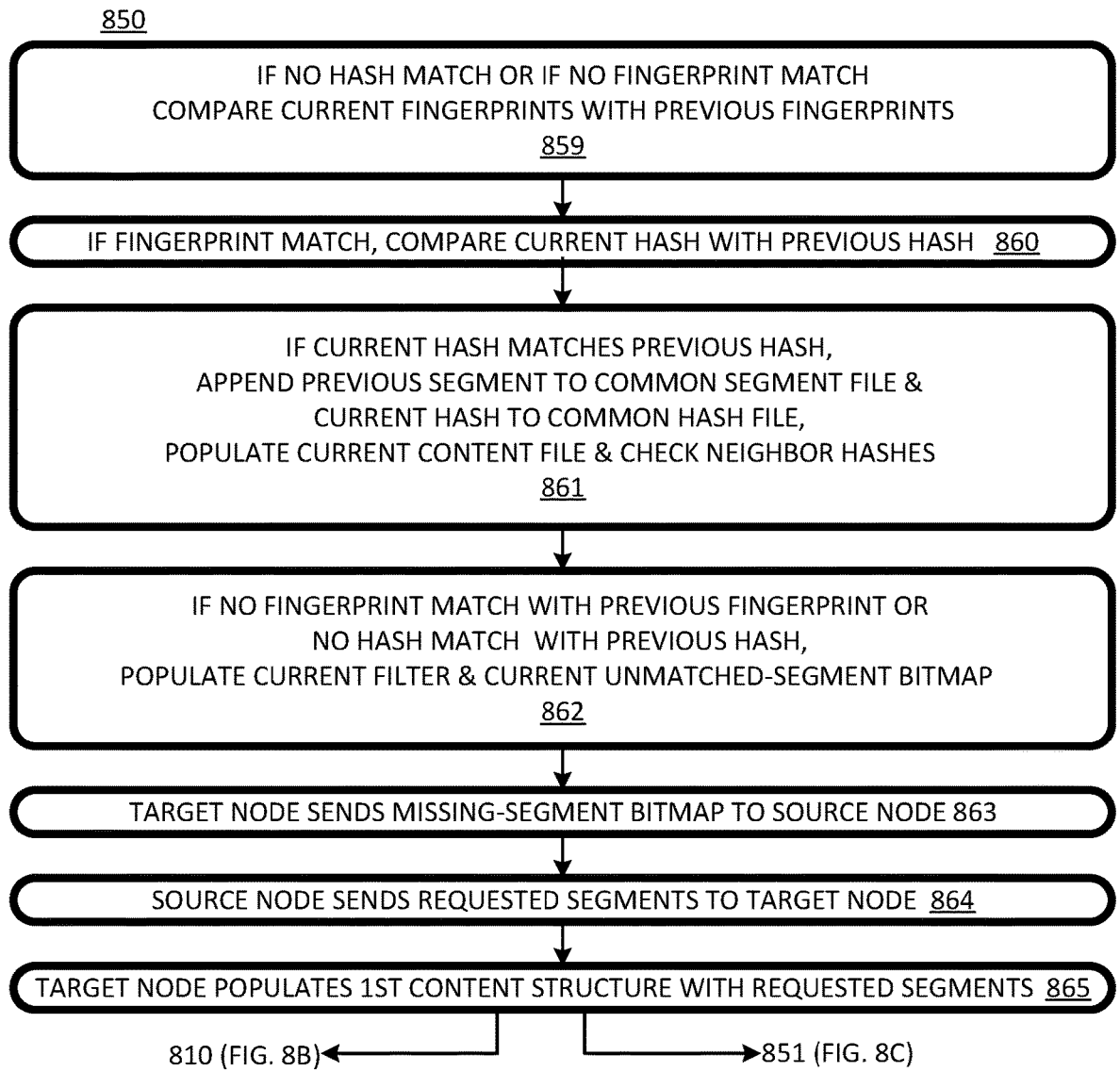

Process 800 is flow charted in greater detail in FIGS. 8B-D. At 810, FIG. 8B, a consolidation occurs at "night", or other time characterized by a sufficient teleportation-free span. The consolidation can include creating or updating a common segment file, a common hash file, and a common (fingerprint-based) probabilistic filter.

A first teleportation begins at 831 (of action 830, FIG. 8A) with a source node generating a first source hash file by hashing segments in a first source content file to be teleported. The first source hash file can include a zero-segment bitmap showing locations in the hash file of hashes of zero-filled segments and locations in the first source content file populated with zero-filled segments. At 832, the source node sends and the target node receives the first source hash file.

At 833, the target node builds a first content structure, a first filter structure, and a first missing-segment bitmap structure. These are to be populated during the first teleportation. At 834, the target node populates the first content copy with any zero-filled segments indicated by the zero-segment bitmap of the first hash file. The populating can include filling a segment location with zeroes, or, in an alternative embodiment, with a reference to a zero segment in the common segment file.

At 835, the target node generates first source fingerprints from first source hashes. At 836, first source fingerprints are compared with common fingerprints in the common cuckoo filter. For each fingerprint match, at 837, corresponding hashes are compared to rule out false positives. The pointer associated with the common fingerprint identifies the location of the corresponding common hash. If there is a hash match, then, at 838, the corresponding segment (or a reference to the corresponding segment in the common segment file) is inserted into the first source copy.

Further at 838, a neighbor search may be conducted on the assumption that neighbors of a matched source hash are likely to match neighbors of a common segment hash. If the source fingerprints are being processed in order, only the successors of a hash match need to be compared. For each neighbor match, an entry is made into the source content copy and the neighbor comparisons continue. Once a mismatch is encountered, fingerprint comparisons are resumed starting at the fingerprint corresponding to the mismatched source fingerprint.

If at 837 for a given fingerprint, there is no hash match or if at 836 there is no fingerprint match, then, at 839, the first missing-segment bitmap can be populated with an indication that the corresponding segment must be transmitted to the target node. Also, at 839, the first filter structure is populated with the first source fingerprints (and associated pointers to first source hashes) that failed to match. These fingerprints correspond to the segments that are not present in the common segment file but will be present in the first content copy on the target node for future teleportations prior to the next consolidation.

At 840, the target node sends the unmatched-segment bitmap to the source node. At 841, the source node returns the unmatched segments to the target node. At 842, the target node populates the first content structure with the just-received unmatched segments. The first content copy then includes the segments that were not represented in the common segment file and references to segments that were found in the common segment file. This completes the first teleportation.

During the first teleportation, the "first" content copy, first hash file, and first cuckoo filter, etc., are, respectively, the current content copy, the current hash file, and current cuckoo filter, e.g., as indicated in FIG. 7. Once the first teleportation is completed, they become, respectively, the previous content copy, the previous hash file, and the previous cuckoo filter, etc.

If at this point, there is an opportunity to consolidate segments into the common segment file, then this can be done, in which case, process 800 returns to action 810. The next teleportation would be considered a new "first" teleportation, as opposed to a second teleportation between consolidations. However, if instead a second teleportation is performed before consolidation, then process 800 continues at 851, shown in FIG. 8C.

At 851, a source node (which may be the same as the one for the first teleportation or which may be a different source node), generates a second source hash file with a zero-segment bit map. For the duration of the second teleportation, the second source content file is referred to as the "current" source content file, the second source hash file is referred to as the current hash file, and so on. At 852, the source node sends and the target node receives (a copy of) the current hash file.

At 853, the target node creates a current content structure, a current filter structure, and a current missing-segment bitmap structure. When populated, these structures will become the current content copy of the source content file, the current cuckoo filter, and the unmatched-segment bitmap to be sent to the source node to request segments not found on the target node.

At 854, the target node populates, based on the zero-filled segment bitmap, the current source content structure with zero segments or references to a zero segment in the common segment file. At 855, the target node generates current fingerprints from the current source hashes. This may be done in the order in which the hashes appear in the current hash file or in another order, e.g., if the hashes are partitioned.

At 856, the current fingerprints are compared with common fingerprints. If a fingerprint match is found, then, at 857, a comparison is made of the corresponding hashes. If a hash match is found, then, at 858, references to common segments are inserted into the current content copy structure. Also at 858, in some embodiments, neighbor hashes are compared until a mismatch is found. Matches found during the neighbor comparisons also lead to references to common segments being inserted into the current content copy.

If, at 857, no hash match is found or, if at 856, there is no fingerprint match for given source fingerprint, this does not trigger a content request to the source node. Instead, at 859, FIG. 8D, the source fingerprint is compared with previous fingerprints in the previous cuckoo filter. If a fingerprint match is found at 859, then, at 860 the corresponding current hash is compared with the corresponding previous hash to address the possibility of a false positive. If a hash match is found, then, at 861, the corresponding previous segment is appended to the common segment file and the corresponding matched hash is appended to the common hash file, and the matching fingerprint is inserted into the common cuckoo filter.

If at 860, no hash match is found or if, at 859, no fingerprint match is found with a previous fingerprint, then, at 862, the current filter is populated with the source fingerprint and a bit is set to indicate in the unmatched-segment bitmap that the corresponding segment is needed from the source node.

At 863, the target node sends the unmatched-segment bitmap to the source node. At 864, the source node returns the segments indicated in the unmatched-segment bitmap. At 865, the target node populates the current content structure with the requested segments. By this time, all segment locations are occupied with requested segments, with zeroes, or with references to common segments. In some embodiments, the source content copy is populated with segments, including segments copied from the common segment file. This completes the second teleportation. Subsequent teleportations iterate actions 851-865 until it is time for the next consolidation at 810.

Herein, "segment" refers to a division of a file. A file can be divided into segments, and each of the segments can be used to generate a corresponding hash. The size (e.g., in bits or bytes) can vary from embodiment to embodiment. Some operating systems define clusters of a particular size, e.g., 4096 bytes. Where an operating system defines a cluster size, the segment size can be set equal to the cluster size or a multiple of the cluster size.

Herein, a "hash" is an identifier that uniquely or substantially uniquely identifies an object, e.g., a file segment from which the hash was generated. In order to be useful for teleportation, a hash should be a fraction (e.g., less than one-half) of the length of the segment it identifies. Thus, there may be a theoretical possibility that a hash might be associated with two or more segments. In practice, that possibility can be made negligible using a sufficient long hash, e.g., 128 bits, 256 bits, or longer.

Herein, a "fingerprint" is a hash-like structure that identifies a hash from which it is derived, but for which the possibility of a false positive identification may be non-negligible. Accordingly, fingerprint matches may have to be confirmed by checking for a match between the corresponding hashes. In practices, fingerprints that are 4-bits to 16 bits in length can be used.

Herein, "pointer" refers to any expression that identifies a location. The term "pointer" encompasses memory and disk addresses, whether they be absolute or relative (as in the case of a file offset).

Herein, all art labelled "prior art", if any, is admitted prior art. All art not labelled prior art is not admitted prior art. Those skilled in the art can recognize there are many variations upon and modifications to the illustrated and otherwise disclosed embodiments that are within the scope of the following claims.

What is claimed is:

1. A content-teleportation process for a virtual machine image file, said process comprising:
   receiving source hashes of source segments of a source content file on a source node, wherein said source content file is derived from said virtual machine image file and said source hashes are derived from said virtual machine image file, said virtual machine image file preserving boundary alignment of subfiles of said virtual machine image file;
   comparing said source hashes of said source segments to target hashes of target segments of target files located on a target node to identify at least one matching target segment that matches at least one of the source segments, each of said source hashes being compared with one or more of said target hashes of said target segments of said target files located on said target node, wherein the source content file includes said subfiles, and said subfiles are aligned with segment boundaries, said comparing of said source hashes to said target further comprising staged hash comparisons, including a first stage in which fingerprints are compared, and a second stage in which said source hashes and said target hashes are compared to rule out false-positive fingerprint matches and wherein said fingerprints are hash-like strings that are too short to preclude false-positive matches:

comparing source fingerprints of the source hashes with target fingerprints of the target hashes to identify at least one matching source fingerprint that matches a target fingerprint;

comparing a source hash associated with the at least one matching source fingerprint with a target hash associated with the target fingerprint that matched the at least one matching source fingerprint;

providing a bitmap with one bit per source segment of the source content file wherein a zero bit indicates a zero segment and a one bit indicates a non-zero segment, said zero segment omitted from said source hash when said source hash is sent to said target node;

said target node determining a location of said received non-zero segment based on said bitmap, such that a plurality of said zero segments can be sent to said target node at a cost of one bit per segment; and assembling a copy of the source content file at the target node so that the copy includes the at least one matching target segment or includes a reference to the at least one matching target segment.

2. The content-teleportation process of claim 1 wherein the source segments are clusters defined by an operating system.

3. The content-teleportation process of claim 1 wherein the comparing identifies at least one unmatched source segment for which there is no match among the compared target segments, the process further comprising: requesting that the at least one unmatched segment be transmitted to the target node, the assembling including inserting the at least one unmatched source segment or a reference to a location on the target node of the unmatched source segment into the copy.

4. The content-teleportation process of claim 1 further comprising:

prior to the receiving of the source hashes, creating or updating a common segment file on the target node, the common segment file including at least some target segments that were copied from target content files on the target node; and generating a common hash file at least in part by hashing segments in the common segment file, at least some of the target hashes being in the common hash file.

5. The content-teleportation process of claim 4 wherein each target segment in the common segment file is unique within the common segment file.

6. The content-teleportation process of claim 4 further comprising deleting a target content file from the target node so that copies of all segments that were on the deleted target content file remain in the common segment file.

7. The content-teleportation process of claim 4 wherein the order of the target hashes in the common hash file corresponds to the order of target segments in the common segment file.

8. The content-teleportation process of claim 1 wherein at least some of the target fingerprints are arranged in a probabilistic filter.

9. The content-teleportation process of claim 8 wherein the probabilistic filter includes entries, each entry including a fingerprint and a pointer pointing to a location of a hash from which the fingerprint was derived.

10. The content-teleportation process of claim 8 wherein the probabilistic filter is a cuckoo filter.

11. The content-teleportation process of claim 1 further comprising:

prior to the receiving of the source hashes, creating or updating a common segment file by copying at least some of the target segments into the common segment file, the common segment file including at least some target segments that were copied from target content files on the target node;

generating a common hash file by hashing segments in the common segment file, at least some of the target hashes being in the common hash file; and generating or updating a common probabilistic filter, the common probabilistic filter including at least some of the target fingerprints that are derived from target hashes in the common hash file.

12. The content-teleportation process of claim 11 wherein each target segment in the common segment file is unique within the common segment file.

13. The content-teleportation process of claim 11 wherein the order of the target hashes in the common hash file corresponds to the order of target segments in the common segment file.

14. The content-teleportation process of claim 13 further comprising, in the event of a hash match, comparing a neighbor source hash that is a neighbor of matched source hash in a source hash file with a neighbor target hash that is a neighbor of the matched common hash in a target hash file without first comparing fingerprints of the neighbor source hash and the neighbor target hash.

15. The content-teleportation process of claim 1 further comprising forming an unmatched-segment bitmap indicating for each segment in the source content file whether or not a copy must be sent to the target node since it is not zero filled and no match is found on the target node.

16. The content-teleportation process of claim 15 further comprising:

sending the unmatched-segment bitmap to the source node; and receiving, at the target node, the segments that must be sent, the assembling including inserting the sent segments or references to the sent segments in the copy.

17. A content-teleportation system for a virtual machine image file, said system comprising non-transitory media encoded with code that, when executed by a processor, causes to be implemented a process including:

receiving source hashes of source segments of a source content file on a source node, wherein said source content file is derived from said virtual machine image file and said source hashes are derived from said virtual machine image file, said virtual machine image file preserving boundary alignment of subfiles of said virtual machine image file;

comparing said source hashes of said source segments to target hashes of target segments of target files located on a target node to identify at least one matching target segment that matches at least one of the source segments, each source hash being compared with one or more target hashes of target segments of target files located on said target node, wherein the source content file includes said subfiles, and said subfiles are aligned with segment boundaries, said comparing of said source hashes to said target further comprising staged hash comparisons, including a first stage in which fingerprints are compared, and a second stage in which said source hashes and said target hashes are compared to rule out false-positive fingerprint matches and wherein said fingerprints are hash-like strings that are too short to preclude false-positive matches:

comparing source fingerprints of the source hashes with target fingerprints of the target hashes to identify at least one matching source fingerprint that matches a target fingerprint;

comparing a source hash associated with the at least one matching source fingerprint with a target hash associated with the target fingerprint that matched the at least one matching source fingerprint;

providing a bitmap with one bit per source segment of the source content file wherein a zero bit indicates a zero segment and a one bit indicates a non-zero segment, said zero segment omitted from said source hash when said source hash is sent to said target node;

said target node determining a location of said received non-zero segment based on said bitmap, such that a plurality of said zero segments can be sent to said target node at a cost of one bit per segment; and assembling a copy of the source content file at the target node so that the copy includes the at least one matching target segment or includes a reference to the at least one matching target segment.

18. The content-teleportation system of claim 17 wherein the source segments are clusters defined by an operating system.

19. The content-teleportation system of claim 17 wherein the comparing identifies at least one unmatched source segment for which there is no match among the compared target segments, the system further comprising: requesting that the at least one unmatched segment be transmitted to the target node, the assembling including inserting the at least one unmatched source segment or a reference to a location on the target node of the unmatched source segment into the copy.

20. The content-teleportation system of claim 17 wherein the process further includes:

prior to the receiving of the source hashes, creating or updating a common segment file on the target node, the common segment file including at least some target segments that were copied from target content files on the target node; and generating a common hash file at least in part by hashing segments in the common segment file, at least some of the target hashes being in the common hash file.

21. The content-teleportation system of claim 20 wherein each target segment in the common segment file is unique within the common segment file.

22. The content-teleportation system of claim 20 wherein the process further includes deleting a target content file from the target node so that copies of all segments that were on the deleted target content file remain in the common segment file.

23. The content-teleportation system of claim 20 wherein the order of the target hashes in the common hash file corresponds to the order of target segments in the common segment file.

24. The content-teleportation system of claim 17 wherein at least some of the target fingerprints are arranged in a probabilistic filter.

25. The content-teleportation system of claim 24 wherein the probabilistic filter includes entries, each entry including a fingerprint and a pointer pointing to a location of a hash from which the fingerprint was derived.

26. The content-teleportation system of claim 24 wherein the probabilistic filter is a cuckoo filter.

27. The content-teleportation system of claim 24 wherein the process further includes:

prior to the receiving of the source hashes, creating or updating a common segment file by copying at least some of the target segments into the common segment file, the common segment file including at least some target segments that were copied from target content files on the target node;

generating a common hash file by hashing segments in the common segment file, at least some of the target hashes being in the common hash file; and generating or updating a common probabilistic filter, the common probabilistic filter including at least some of the target fingerprints that are derived from target hashes in the common hash file.

28. The content-teleportation system of claim 27 wherein each target segment in the common segment file is unique within the common segment file.

29. The content-teleportation system of claim 27 wherein the order of the target hashes in the common hash file corresponds to the order of target segments in the common segment file.

30. The content-teleportation system of claim 29 wherein the process further includes, in the event of a hash match, comparing a neighbor source hash that is a neighbor of matched source hash in a source hash file with a neighbor target hash that is a neighbor of the matched common hash in a target hash file without first comparing fingerprints of the neighbor source hash and the neighbor target hash.

31. The content-teleportation system of claim 24 wherein the process further includes forming an unmatched-segment bitmap indicating for each segment in the source content file whether or not a copy must be sent to the target node since it is not zero filled and no match is found on the target node.

32. The content-teleportation system of claim 31 wherein the process further includes:

sending the unmatched-segment bitmap to the source node; and receiving, at the target node, the segments that must be sent, the assembling including inserting the sent segments or references to the sent segments in the copy.

* * * * *